United States Patent
Futral

(10) Patent No.: US 6,615,282 B1
(45) Date of Patent: Sep. 2, 2003

(54) ADAPTIVE MESSAGING

(75) Inventor: William T. Futral, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/461,237

(22) Filed: Dec. 16, 1999

Related U.S. Application Data

(60) Provisional application No. 60/135,259, filed on May 21, 1999.

(51) Int. Cl.[7] .................................. G06F 13/00
(52) U.S. Cl. ............... 710/1; 710/4; 710/8; 710/20; 710/33; 710/36; 710/39; 710/52
(58) Field of Search ................... 710/1, 4, 8, 20, 710/33, 36, 39, 52

(56) References Cited

U.S. PATENT DOCUMENTS

| | | | |
|---|---|---|---|
| 5,208,810 A | * 5/1993 | Park | 370/230 |
| 5,475,433 A | * 12/1995 | Jeong | 375/240.05 |
| 5,550,957 A | 8/1996 | Davidson, Jr. et al. | |
| 5,633,870 A | 5/1997 | Gaytan et al. | |
| 5,777,624 A | * 7/1998 | Munson | 345/605 |
| 5,937,436 A | 8/1999 | Watkins | |
| 6,112,263 A | 8/2000 | Futral | |
| 6,125,433 A | 9/2000 | Horstmann et al. | |

* cited by examiner

*Primary Examiner*—Jeffrey Gaffin
*Assistant Examiner*—Mohammad O. Farooq
(74) *Attorney, Agent, or Firm*—Antonelli, Terry, Stout & Kraus, LLP

(57) ABSTRACT

In an example embodiment, a data transfer method adaptively transfers data from a host device to a target device across a channel-based interconnect. The method includes determining whether or not the size of the data to be transferred is greater than the maximum payload of a cell for the channel-based interconnect. If the size of the data to be transferred is not greater than the maximum payload, then a single cell is transferred from the host device to the target device which includes all of the data. If the size of the data to be transferred is greater than the maximum payload, then a request message is transferred from the host device to the target device. The request message includes a portion of said data to be transferred and control information indicating that not all of the data to be transferred is included in the request message.

23 Claims, 4 Drawing Sheets

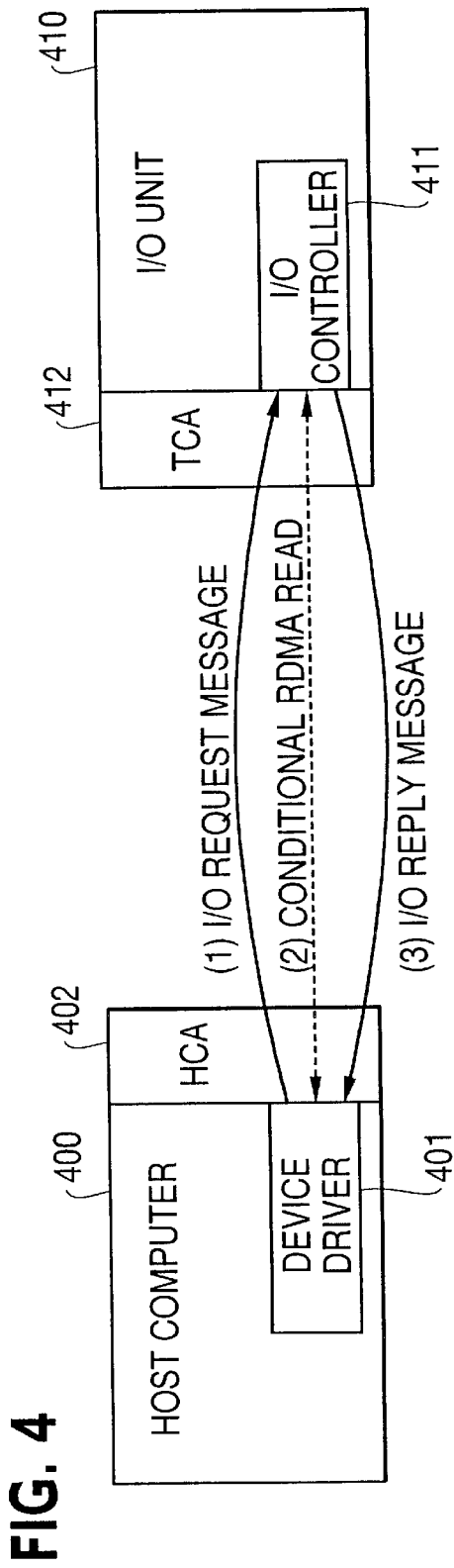
FIG. 4
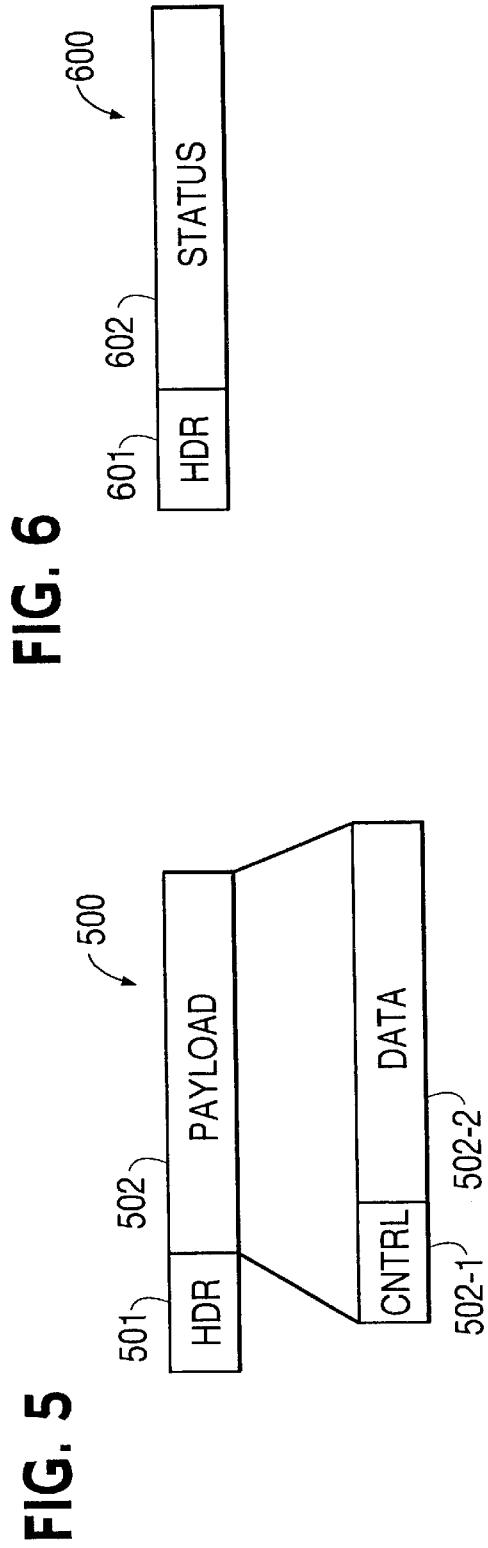
FIG. 6
FIG. 5

ADAPTIVE MESSAGING

This application is a continuation application of Provisional Application Ser. No. 60/135,259, filed on May 21, 1999.

BACKGROUND

1. Field of the Invention

This invention relates generally to methods and apparatus for transferring data. In particular, the present invention relates to methods and apparatus for efficiently passing I/O transaction messages and their associated data between a host device and a target device.

2. Description of the Related Art

Even though a host device such as a conventional server may perform optimally, the data transfer performance of the server can be less than optimum because of the manner in which the input/output (I/O) subsystem of the server transfers data blocks to and from a connected network. For example, the transferred data may vary greatly from large prerecorded contiguous blocks of image data, such as multimedia data from a CD-ROM, to much smaller heavily fragmented user data. In local area networks (LANs), about 80% of the LAN packets are less than 200 bytes in length. Despite the prevalence of small data blocks, about 80% of the total amount of data is carried in maximum size LAN packets, which range anywhere from 1500 bytes to over 64000 bytes depending on the LAN technology.

A host device can transfer a data block to a target device by pushing it out to the target device all at once. An advantage of this "push" method is that the I/O driver in the host device can be simple since it does not have to interact with the target device and can push out the data block as soon as it is able. The push model works well with small data blocks that can be easily buffered in the I/O controller of the target device. However, the number and size of buffers in the I/O controller of the target device must be large enough to handle the biggest possible data blocks. If the biggest possible data block can be 1 or 2 megabytes for example, a problem exists in that a corresponding 1 or 2 megabyte buffer memory has to be provided within the target device. See FIG. 1. Such an excessive memory requirement is not cost effective. Accordingly, the push model is not feasible in many circumstances.

If each transferred data block is limited to some predetermined size, e.g., 2 kilobytes, then the buffer(s) in the target device can have a correspondingly limited size. See FIG. 2. The problem with such an arrangement is that the limitation in block transmission size requires large blocks of data to be sliced into smaller network packets, with a header identifier attached to each of the smaller network packets. The smaller network packets are repeatedly sent until all of the data block has been transferred. This solution increases the number of data transfers, the amount of data being transmitted across the network, is fixed to the size of the buffer, and also represents significant record-keeping problems since the bytes of the packets typically come from fragmented data blocks.

As an alternative to the push model, the I/O controller of the target device can process a script and pull the data from memory in the host device by continuously reading a command list according to the script. As an example, suppose the host device wishes to transfer a block of data out to a local area network over a network interface controller (NIC). The host device first stores the data block in internal memory and sends a message alerting the NIC of the output command. The NIC must decipher the message and then read host memory to obtain the address of the output command block. It must also read a pointer, which is the value representing an address within the host memory where the data associated with the output command can be found. (The pointer may be virtual or physical and the location of the data is not necessarily contiguous with the location of the command. Indeed, the data may be split, requiring a Scatter/Gather List (SGL) to describe the locations of the data.) The NIC then goes to the address of host memory pointed to by the pointer. The block of data is read from the host memory back to the NIC, which will require several more fetches. The data is then subsequently transferred from the NIC to the network. Even if the host sets aside known areas for the command blocks in memory so that the NIC always knows the address of the command block, the NIC would still need to read the write command to know where the data is located and to perform the fetches to obtain the data.

Such a conventional data transfer procedure (illustrated generally in FIG. 3) of loading data in local memory and sending a command with pointer (step 1), waiting for and receiving a request for the data (step 2) and subsequently sending the data in response to the request (step 3) has substantial inherent latencies and delays. The procedure is very inefficient and slows down the entire system since many processor cycles will pass before the data transfer is completed. The latency incurred when transferring data to a network from a host device in this manner can greatly diminish the performance of the target device since it is usually unable to engage in other operations until the data transfer is complete. This latency is longer and even more complicated when the host device is a server because there is so much competition for server resources including system memory, processor(s) and multiple I/O devices. Indeed, the lack of efficiency in transferring data blocks may have a larger effect on overall performance than the processor speed or other performance characteristics of the host device and other elements in the network. In particular, the buses and/or controller in the I/O subsystem connecting the host device to the network may be a bottleneck in transferring data over the network and the performance of the I/O subsystem needs to be improved.

SUMMARY

The present invention is directed to the transfer of data between a host device and a target device. A data transfer method adaptively transfers data from the host device to the target device across a channel-based interconnect. The method includes determining whether or not the size of the data to be transferred is greater than the maximum payload of a cell for the channel-based interconnect. If the size of the data to be transferred is not greater than the maximum payload, then a single cell is transferred from the host device to the target device which includes all of the data. If the size of the data to be transferred is greater than the maximum payload, then a request message is transferred from the host device to the target device. The request message includes a portion of said data to be transferred and control information indicating that not all of the data to be transferred is included in the request message. The target device transfers the remainder of the data from the host at the same time it starts processing the data in the request.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation.

FIG. 4 is a diagram showing an example embodiment of the invention.

FIG. 5 is a chart illustrating the format of an I/O Request Message used in the example embodiment of the invention.

FIG. 6 is a chart illustrating the format of an I/O Reply Message used in the example embodiment of the invention.

DETAILED DESCRIPTION

Figure 2:
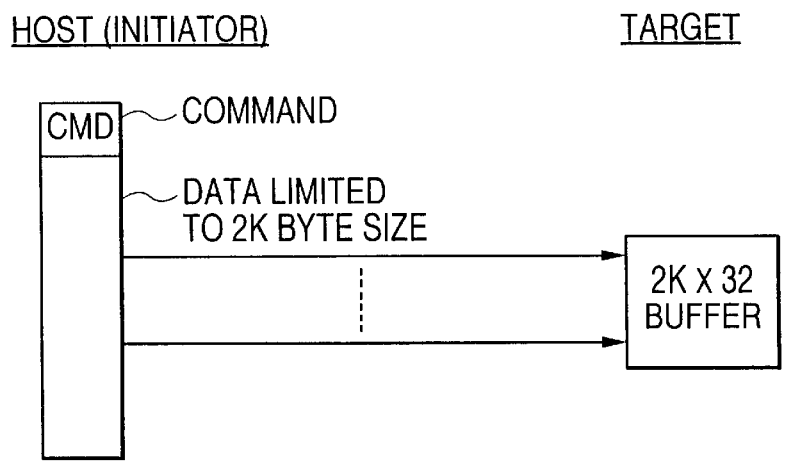
FIG. 2 is a chart illustrating a conventional variation of the push method in which the data is transferred between a host device and a target device sequentially in blocks of limited size.
Figure 1:
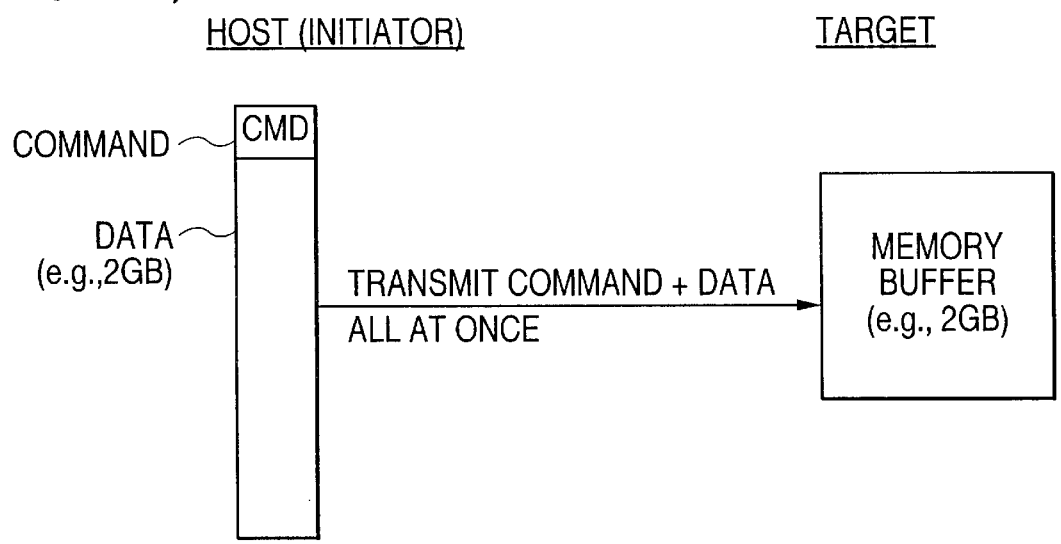
FIG. 1 is a chart generally illustrating a conventional "push" method of transferring data between a host device and a target device.

An example embodiment of the present invention seeks to decrease the inefficiencies and latency of the data transfer to an input/output (I/O) unit in a server architecture, such as what occurs when an I/O data block is transferred between a processor and a network interface controller (NIC) for a local area network. In particular, the example embodiment overcomes the disadvantages of conventional PCI compliant I/O adapters which generally cannot accomplish data transfers without the multiple steps of the load/store method illustrated in FIG. 3. Computer systems generally have a processor, associated system memory, an input/output (I/O) device, and at least one bus, such as a PCI bus, connecting these components. A server is a type of computer system having an architecture or otherwise designed to be able to support multiple I/O devices and to transfer data at high speed to other computer systems over a network. (Due to recent advances in the performance and flexibility of computer systems, many modern computers are servers under this definition.)

Although many conventional servers utilize PCI buses, the example embodiment of the invention sets forth a data transfer where there is a channel-based switched fabric interconnect supporting remote direct memory access (RDMA) to virtual addresses, thus enabling protected, target-managed data transfer. The example embodiment attempts to reduce the latency when an element of the host server, such as one of the processors, transfers a data block to a local area network over such a channel. However, the method according to the example embodiment is not limited in its application to local area networks. In particular, the method according to the example embodiment may be useful for transferring data among computers and other devices on various asynchronous networks, especially where latency may be critical. Consequently, the data may be transferred in network packets of different sizes depending on the target device and on various network characteristics such as the transfer protocol (for example, ethernet packets), etc.

The example application of the invention is in a network interface controller incorporated in the input/output unit of a server architecture. However, such an application is but one of several possible examples of the invention which may, of course, be applied to any host device or to any target device or in any pair of devices where an improvement in transferring data blocks between the devices is desired for whatever reason.

The switched fabric configuration between the host device and target device in the example embodiment is the Next Generation I/O (NGIO) architecture, Version 1.0, published Jul. 22, 1999, now know as InfiniBand™ as set forth by the "InfiniBand™ Architecture Specification", the InfiniBand™ Trade Association on Jun. 19, 2001. The channel-based interconnect in the example embodiment is the Virtual Interface (VI) architecture described in the Virtual Interface Architecture Specification, Version 1.0, Dec. 16, 1997, jointly authored by Intel Corporation, Microsoft Corporation, and Compaq Computer corporation. However, the example embodiment and other embodiments of the invention may utilize any other architecture and channel-based interconnect which supports both message passing and remote direct memory access, such as the System I/O (SIO) architecture currently being developed as a standardization of NGIO with other architectures. In this patent application, message passing refers to the transfer of data from one end of a channel to the other end wherein the unit receiving the data determines the desired location of the transferred data in its memory. In contrast, remote direct memory access (RDMA) allows the initiating end of a data transfer operation to identify the memory location at the receiving end of the channel where the data is retrieved from or will be stored at the completion of the data transfer operation.

According to the present invention, a channel is any means of transferring data, including but not limited to virtual channels, used to transfer data between two endpoints. While the example embodiment is an NGIO implementation and this channel definition is provided in the NGIO specification identified above, the present invention is not so limited. Furthermore, the terminology used in this application is consistent with the aforementioned NGIO specification, and other architectures may use different terminology to describe similar and corresponding aspects. For example, in NGIO, the smallest possible autonomous unit of data is called a cell, and a packet is made up of a number of such cells. In contrast, SIO or InfiniBand™ uses the term "packet" to describe the smallest possible autonomous unit of data instead of "cell" as in NGIO, and uses the term "message" instead of "packet". Furthermore, an SIO packet differs slightly from the corresponding NGIO cell. An NGIO cell has a fixed header size and a fixed maximum payload of 256 bytes. An SIO packet has several headers of fixed length, but which are only conditionally present in the packet. Also, the payload of an SIO packet is a minimum of 256 bytes and the maximum payload is variable and negotiable.

Despite the difference in terminology noted in the previous paragraph, each architecture has the characteristic that, for a data transfer in which the data size is larger than the payload of the smallest possible autonomous unit of data, the data to be transferred is broken up into multiple elements that go into the payloads of various cells and are transported across in a series of operations. While the embodiments of the invention can be applied to any I/O technology, the traffic studied in local area networks typically has fragmented data in the first 64 bytes of transferred packets. There are inefficiencies in the fragmentation and reassembly because the data cannot be processed at the receiving end until the last cell containing an element of the data is received. Large transfers, in particular, can hold up resources for a long time since there must be a validation that the entire payload is without uncorrectable errors. (Error correction information may be included in the cells in addition to the header and payload.)

Figure 3:
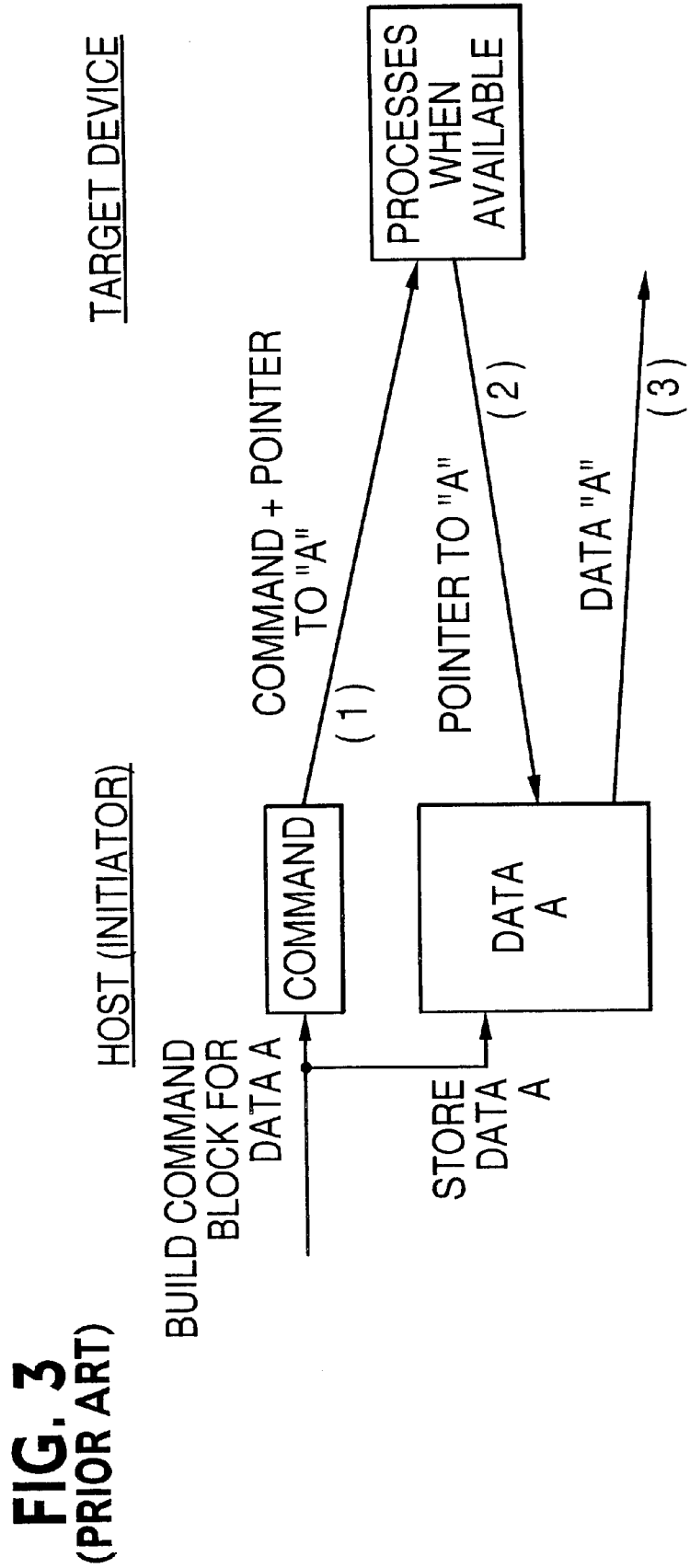
FIG. 3 is a chart illustrating the steps of a conventional write operation in which data is transferred from a host device to a target device.

As shown in the NGIO example embodiment of FIG. 4, host computer 400 has a device driver 401 which carries out the adaptive messaging method according to the example embodiment. Data is transferred from host computer 400 to I/O unit 410 through a host channel adapter (HCA) 402, and across a channel-based NGIO switching fabric (not shown). An I/O controller 411 in I/O unit 410 interacts with device driver 401 to transfer data through a target channel adapter (TCA) 412 and across the channel-based NGIO switching fabric. The switching fabric may contain many different switches and redundant paths throughout the fabric, such that a plurality of messages can be traveling through the switching fabric at any given time. The switched fabric configuration can contain a plurality of channel adapters, such that there can be a multitude of different messages traveling through the fabric and where all of the various connected devices can continue operating while their messages are traveling through the switching fabric. Accordingly, the inherent delays in deciphering the command and transferring data in the several steps required in the conventional method shown in FIG. 3 are not experienced by the connected host and target devices, which can continue processing while the data is being transferred.

The data transfers are optimized through the host channel adapter 402 and target channel adapter 412 at all times. This helps avoid the processor or other elements of the host computer 400 or I/O unit 410 from having to expend system resources to accomplish transfer of data blocks since there may be access conflicts with other functions. When host computer 400 issues an output command, for example, it simply passes the same to the device driver 401, which delivers an I/O Request Message, as illustrated in FIG. 5 and described below, to host channel adaptor 402. The host channel adapter 402 injects the I/O Request Message into the switched fabric such that the host computer 400 does not have to wait for acknowledgment or and locking of a system bus, but instead can go on to perform other processing operations. In accordance with the implementation in the NGIO specification, once injected into the switched fabric, the I/O Request Message travels through the switches and eventually arrives at the target channel adapter 412 for I/O unit 410. Although not shown in FIG. 4, I/O unit 410 is a network interface controller for a local area network (not shown) and functions as an intermediary in transfering data between host computer 400 and the local area network. Of course, host computer 400 can be a server which operates as a host device when sending data over the local area network through I/O unit 410 or operates as a target device when receiving a data transfer over the local area network initiated by another device.

As shown in FIG. 5, the I/O Request Message 500 includes a transaction header 501 and a payload 502 of 256 bytes. The payload 502 has a first part 502-1 used for control information and a second part 502-2 used for data. As an example, payload 502 can be divided up so that first part 502-1 consists of 32 bytes and second part 502-2 consists of 224 bytes. This is an example only and other divisions are permissible, although it is preferred that second part 502-2 has at least 200 bytes.

The adaptive messaging method of the example embodiment focuses on a single cell or packet as the most efficient, effective, way of transferring data. As noted in the background of the invention, most of the data transfers are less than the 256 byte payload of NGIO cells, so that most LAN traffic can be accommodated by transferring single cell packets. More specifically, as indicated by (1) in FIG. 4, an I/O Request Message is always first transmitted from device driver 401 across the switched fabric to the I/O controller 411. For any particular data block to be transferred, it is determined in device driver 401 whether or not the total amount of data to be transferred is smaller than second part 502-2 of an NGIO cell. If it is, then the entire data block is immediately transferred by device driver 401 to I/O controller 411 in a single cell, effectively constituting a push operation for up to 224 bytes of data. Since the block size is less than a cell size, each transaction occurs as a single NGIO cell/packet.

This method results in an immediate advantage compared to the conventional method shown in FIG. 3 which must have operations going in two opposite directions, plus a memory access. For small-sized data transfers, the method of the example embodiment eliminates two of the three operations in the conventional method in FIG. 3 and at the same time improves the latency considerably because, at the time the I/O unit 410 is ready to operate on the transferred data, all of it is immediately available. This simplifies the processing at I/O controller 410 and avoids many of the problems associated with previous data transfer methods which attempted to predict and transfer data in advance so that I/O unit 410 would have all of the data as soon as possible for processing or transfer to an output queue for the local area network. Since the first 224 bytes are always pushed, the host channel adapter 402 provides all of the scatter/gather capability in the NGIO hardware such that the data is immediately delivered to the target as one contiguous block of data. This minimizes the number of NGIO operations and transaction latency while improving the efficiency of data transfers.

Of course, the data block to be transferred can be large enough so that a single cell packet is not always sufficient to transfer all of the data. If the data block to be transferred is bigger than second part 502-2 of the NGIO cell, then a different I/O Request Message 500 is transferred from device driver 401 to I/O controller 411. The I/O Request Message in such an instance combines control information including a memory token pointer in first part 502-1 and up to 224 bytes of the data in second part 502-2. The memory token provides the I/O controller 411 with access to the memory location in host computer 400 of the rest of the data to be transfered.

The memory token in part 502-1 of the I/O Request Message can be of any one of a number of different formats, e.g., simply a series of bits indicating the address of the remaining left-over data in memory of host computer 400. In the example embodiment, the memory token consists of a virtual address and a memory handle. The virtual address is determined by the host computer and when received as part of a RDMA read operation, it is converted by a translation table in the host computer into a physical address in memory. The memory handle is determined by host channel adapter 402 and grants the RDMA read operation access to the location in memory. The host channel adapter may require that the memory handle accompanying the RDMA read operation is the same as that included in the I/O Request Message to ensure that the initiator of the RDMA read operation is entitled to access to the data. In advanced memory handle techniques, the memory handle may also indicate the privilege of the RDMA read operation to access the memory in host computer 400.

The I/O controller 411 then immediately stores the data contained in second part 502-2 of the I/O Request Message in an internal buffer (not shown). It also recognizes from the control information that additional data will be required, whereupon it can, but does not necessarily, immediately instruct target channel adapter 412 to use the conditional RDMA read capability of the VI/NGIO channel-based interconnect (indicated by (2) in FIG. 4) to fetch the remaining data from the correct memory location of the host computer 400 by using the memory token in the control information. The exact format of the conditional RDMA read operation is not an essential part of the invention and can be determined according to the switching fabric configuration and interconnect utilized in any particular embodiment of the invention. An advantage of using the RDMA read operation is that the I/O controller 411 only has to provide the same 256 byte buffers rather than buffers for the total maximum size of a transferred data packet having a number of cells which can be very large as noted previously, thus reducing the cost of the I/O controller due to memory and increasing the performance/cost ratio of the I/O controller. Especially in the local area network environment of the example embodiment, it is important that the network interface controllers be cost effective, exhibit low latency and high performance.

After the initial RDMA read operation, I/O controller 411 will initiate multiple RDMA read operations as necessary to retrieve the multiple pieces of the left-over data in the case of very large data transfers. This process is indicated by the dashed line at (2) in FIG. 4. In the example embodiment, I/O controller 411 schedules the RDMA read operations at a rate consistent with the resources on I/O unit 410. In particular, it schedules the RDMA read operations at the rate that it and I/O unit 410 can best consume them thus increasing efficiency. When the RDMA read operations are completed, I/O controller 411 sends an I/O Reply Message, indicated by (3) in FIG. 4. As shown in FIG. 6, I/O Reply Message 600 consists of a transaction header 601 identifying the data transfer and a status part 602 indicating the completed status of the data transfer.

A key advantage of this example embodiment of the adaptive messaging method is the efficiency with which the I/O unit 410 can use its resources. Host computers, especially servers, typically have many gigabytes of memory and a large amount of data that is being transferred out to a network. But the amount of memory on an I/O controller 411 is relatively small in comparison. The granularity of cells passed back and forth in the NGIO switching fabric allows the adaptive messaging method of the example embodiment to optimize use of buffers (not shown) in the I/O controller 411.

Figure 7:
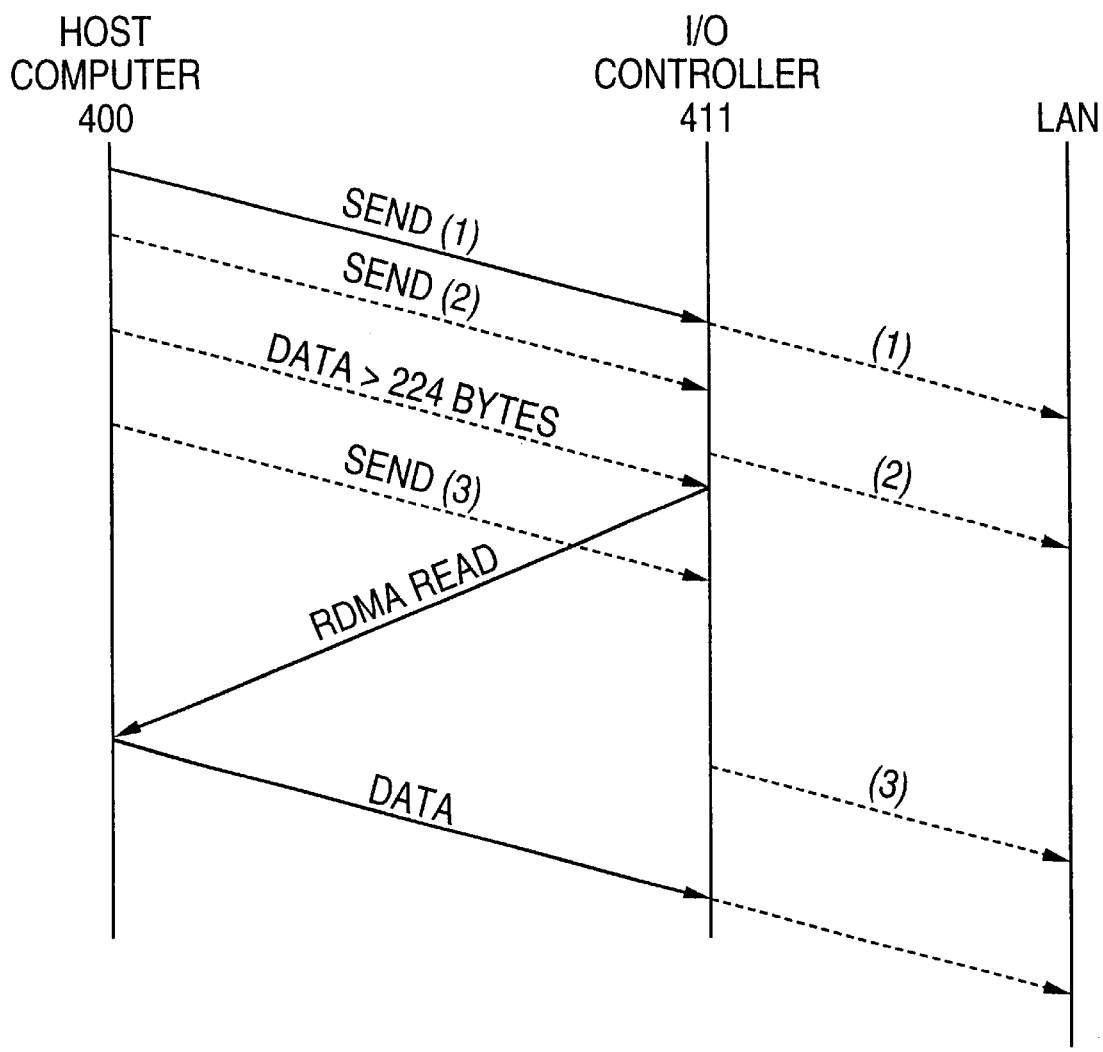
FIG. 7 is a flow diagram of a hypothetical series of data transfer operations between a host device and a target device utilizing an adaptive messaging method according to the example embodiment of the invention.

FIG. 7 shows a flow diagram of a hypothetical series of data transfer operations between host computer 400 and I/O controller 411 (a network interface controller) and a LAN utilizing an adaptive messaging method according to the example embodiment of the invention. As mentioned before, even though the I/O controller 411 can immediately initiate a RDMA read operation, it may delay doing so if its buffers are full or if it is preoccupied with other processing tasks. The flow diagram shows a series of lines representing a corresponding series of different data sends (1)–(4) from host computer 400 to I/O controller 411. While send (1) is immediately forwarded on to the LAN, sends (2), (3) and (4) are delayed and held in a buffer to be forwarded to the LAN at a later point in time. The shaded regions indicate that each transfer to LAN takes time itself.

FIG. 7 shows what may happen when one of the sends has data greater than 224 bytes. The RDMA read for the data send having data in excess of 224 bytes is initiated immediately and, while the operation is taking place, the data for previously occurring send (2) is in the interim forwarded onto the LAN. Depending on ordering rule, send (4) might be forwarded to the LAN while I/O controller 411 is waiting for send (3) data. FIG. 7 illustrates strong ordering where send (4) is delayed until after send (3). FIG. 7 is intended to be hypothetical and illustrative only of the ability of I/O controller 411 to schedule data transfer operations. Numerous different flows are of course possible.

Although an example embodiment, the invention is not limited to the example embodiment illustrated in FIG. 4. Indeed, an advantage of the invention is that it is particularly useful and widely adaptable to any I/O device having latency in data transfer operations. In this way, data transfers can be efficient in both a server that has a great deal of network I/O interfaces and other interfaces. The example embodiments will automatically adapt to transfer characteristics in which large blocks of data are generally asynchronously transferred as well as small blocks of data. Indeed, the example embodiments will adapt to any I/O data interface.

Other features of the invention may be apparent to those skilled in the art from the detailed description of the example embodiments and claims when read in connection with the accompanying drawings. While the foregoing and following written and illustrated disclosure focuses on disclosing example embodiments of the invention, it should be understood that the same is by way of illustration and example only, is not to be taken by way of limitation and may be modified in learned practice of the invention. While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

What is claimed is:

1. A method of adaptively transferring data from a host device to a target device across a channel-based interconnect, said method comprising:

determining if the size of the data to be transferred is greater than a maximum payload of a cell for the channel-based interconnect;

if the size of the data to be transferred is not greater than said maximum payload, then transferring a single cell from the host device to the target device which includes all of the data to be transferred; and if the size of the data to be transferred is greater than said maximum payload, then transferring a request message from the host device to the target device, said request message including a portion of said data to be transferred and control information indicating that not all of the data to be transferred is included in the request message.

2. The method as claimed in claim 1, wherein said control information includes a memory token.

3. The method as claimed in claim 2, wherein the target device, in response to the control information, initiates a remote direct memory access read operation for a part of the data not included in said request message at a memory location in the host device identified by the memory token.

4. The method as claimed in claim 3, wherein the memory token includes a memory handle granting the target device access to said memory location in the host device.

5. The method as claimed in claim 3, wherein the target device initiates the remote direct memory access read operation as an immediate response to the control information in the request message.

6. The method as claimed in claim 3, wherein the target device schedules the remote direct memory access read operation as an immediate response to the control information in the request message and later initiates the remote direct memory access read operation.

7. The method as claimed in claim 3, wherein the target device initiates a plurality of remote direct memory access read operations for the remainder of the data not included in said request message.

8. The method as claimed in claim 7, wherein the target device sends a reply message to the host device as soon as the remainder of the data included in said request message is transferred by said plurality of remote direct memory access read operations.

9. A host device configured to initiate the transfer of data to a target device, said host device comprising:

a processor;

a memory accessible by said processor; and a device driver connected to said processor and said memory, said device driver adapted to control the transfer of data to said target device by: determining if the size of the data to be transferred is greater than a maximum payload of a cell of a channel-based interconnect connecting the host device and the target device; if the size of the data to be transferred is not greater than said maximum payload, then transferring a single cell from the host device to the target device which includes all of the data to be transferred; and if the size of the data to be transferred is greater than said maximum payload, then transferring a request message from the host device to the target device, said request message including a portion of said data to be transferred and control information indicating that not all of the data to be transferred is included in the request message.

10. The host device as claimed in claim 9, wherein the control information includes a memory token.

11. The host device as claimed in claim 10, wherein the device driver transfers, in response to a remote direct memory access read request received from the target device, an additional part of the data stored in said memory.

12. The host device as claimed in claim 11, wherein the device driver confirms the validity of the memory token included with the remote direct memory access read request and transfers the additional part of the data stored at the address location of said memory identified by said memory token.

13. The host device as claimed in claim 12, wherein the memory token includes a memory handle granting the target device access to said address location of said memory in the host device.

14. An input/output unit configured to transfer data to and from a host device across a channel-based interconnect, said input/output unit comprising:

a target channel adapter adapted to send and receive messages from said channel-based interconnect; and an input/output controller adapted to transfer data according to an adaptive messaging method of receiving data from said host device, said method comprising: determining if the size of the data to be transferred is greater than a maximum payload of a cell for the channel-based interconnect; if the size of the data to be transferred is not greater than said maximum payload, then transferring a single cell from the host device to the input/output unit which includes all of the data to be transferred; and if the size of the data to be transferred is greater than said maximum payload, then transferring a request message from the host device to the input/output unit, said request message including a portion of said data to be transferred and control information indicating that not all of the data to be transferred is included in the request message.

15. The input/output unit as claimed in claim 14, wherein the control information includes a memory token.

16. The input/output unit as claimed in claim 15, wherein the input/output controller, in response to the control information, initiates a remote direct memory access read operation for a part of the data not included in said request message at a memory location in the host device identified by the memory token.

17. The input/output unit as claimed in claim 16, wherein the memory token includes a memory handle granting access to said memory location in the host device.

18. The input/output unit as claimed in claim 16, wherein the input/output controller initiates the remote direct memory access read operation as an immediate response to the control information in the request message.

19. The input/output unit as claimed in claim 16, wherein the input/output unit controller schedules the remote direct memory access read operation as an immediate response to the control information in the request message and later initiates the remote direct memory access read operation.

20. The input/output unit recited in claim 16, wherein the input/output controller initiates a plurality of remote direct memory access read operations for the remainder of the data not included in said request message.

21. The input/output unit as claimed in claim 20, further comprising a plurality of buffers and an output queue, wherein the input/output controller schedules the plurality of remote direct memory access read operations in accordance with the status of said buffers and output queue.

22. The input/output unit as claimed in claim 20, wherein the input/output controller sends a reply upon completion of said plurality of remote direct memory access read operations for the remainder of the data not included in said request message.

23. The input/output unit as claimed in claim 20, wherein the input/output unit transfers each send message to a local area network and sends a reply upon completion of each message transferred to the local area network.

* * * * *